United States Patent
Schweiss et al.

(10) Patent No.: US 12,070,885 B2
(45) Date of Patent: Aug. 27, 2024

(54) METHOD FOR MANUFACTURING RENEWABLE FILM AND PRODUCTS

(71) Applicant: REYNOLDS CONSUMER PRODUCTS LLC, Lake Forest, IL (US)

(72) Inventors: Thomas Joseph Schweiss, Ingleside, IL (US); Douglas Duane Bonke, Appleton, WI (US)

(73) Assignee: REYNOLDS CONSUMER PRODUCTS LLC, Lake Forest, IL (US)

( * ) Notice: Subject to any disclaimer, the term of this patent is extended or adjusted under 35 U.S.C. 154(b) by 7 days.

(21) Appl. No.: 17/837,813

(22) Filed: Jun. 10, 2022

(65) Prior Publication Data

US 2023/0398727 A1    Dec. 14, 2023

(51) Int. Cl.
  *B29C 48/10*  (2019.01)
  *B29C 48/00*  (2019.01)
  *B29C 48/275* (2019.01)

(52) U.S. Cl.
  CPC .......... *B29C 48/10* (2019.02); *B29C 48/0018* (2019.02); *B29C 48/277* (2019.02)

(58) Field of Classification Search
  None
  See application file for complete search history.

(56) References Cited

U.S. PATENT DOCUMENTS

| | | |
|---|---|---|
| 5,922,379 A | 7/1999 | Wang |
| 6,200,404 B1 | 3/2001 | Andersen et al. |
| 6,231,970 B1 | 5/2001 | Andersen et al. |
| 6,235,815 B1 | 5/2001 | Loercks et al. |
| 6,235,816 B1 | 5/2001 | Lorcks et al. |
| 7,077,994 B2 | 7/2006 | Bond et al. |

(Continued)

FOREIGN PATENT DOCUMENTS

| | | |
|---|---|---|
| AU | 637685 | 6/1993 |
| CA | 2762589 | 6/2013 |

(Continued)

OTHER PUBLICATIONS

Arena, "Effects of nanoclays and nano-calcium carbonate (CaCO3) on glycerol-plasticized thermoplastic cornstarch (TPS) polymer blends" Society of Plastics Engineers—Global Plastics Environmental Conference 2010, GPEC 2010, 2010. [abstract only, 1 page] https://hero.epa.gov/hero/index.cfm/reference/details/reference_id/8746308.

(Continued)

*Primary Examiner* — Robert J Grun
(74) *Attorney, Agent, or Firm* — STEPTOE LLP

(57) ABSTRACT

A method of manufacturing a film includes forming a blend containing a renewable content starch, a renewable content mineral, and polyethylene, operating a mass flow hopper to maintain a consistent mass flow rate of the blend to a feed throat of an extruder, and operating the extruder with a screw speed and melt temperature based on the amount by weight of the starch and mineral within the blend. The melt is passed through a screen pack with a mesh rating based on the amount by weight of the starch and mineral within the blend, is passed through a die, and is cooled into a film. The film is nipped to a gauge such that the film can be formed into a bag.

20 Claims, 1 Drawing Sheet

(56) References Cited

U.S. PATENT DOCUMENTS

| | | |
|---|---|---|
| 7,098,292 B2 | 8/2006 | Zhao et al. |
| 7,172,814 B2 | 2/2007 | Hodson |
| 7,241,832 B2 | 7/2007 | Khemani et al. |
| 7,344,784 B2 | 3/2008 | Hodson |
| 7,989,524 B2 | 8/2011 | Glenn et al. |
| 7,998,888 B2 | 8/2011 | Shi et al. |
| 8,188,185 B2 | 5/2012 | Wang et al. |
| 8,329,601 B2 | 12/2012 | Shi et al. |
| 8,367,173 B2 | 2/2013 | Wnuk et al. |
| 8,466,337 B2 | 6/2013 | Wang et al. |
| 8,697,245 B2 | 4/2014 | Khemani et al. |
| 8,809,424 B2 | 8/2014 | Feron et al. |
| 8,858,986 B2 | 10/2014 | Scholz et al. |
| 9,206,306 B2 | 12/2015 | Kaneko et al. |
| 9,555,931 B2 * | 1/2017 | Blythe .................. B65D 33/08 |
| 10,822,491 B2 | 11/2020 | Marcille et al. |
| 10,882,977 B1 * | 1/2021 | Showalter ................ C08K 3/26 |
| 2003/0216492 A1 | 11/2003 | Bowden et al. |
| 2004/0122135 A1 * | 6/2004 | Halley .................... C08L 67/06 |
| | | 524/47 |
| 2005/0026529 A1 | 2/2005 | Bond et al. |
| 2005/0079785 A1 | 4/2005 | Bond et al. |
| 2005/0203208 A1 | 9/2005 | Ruiz |
| 2007/0042207 A1 | 2/2007 | Berger et al. |
| 2009/0110654 A1 | 4/2009 | Hagemann et al. |
| 2009/0312462 A1 | 12/2009 | Oakley et al. |
| 2010/0086714 A1 | 4/2010 | Sato |
| 2010/0112335 A1 | 5/2010 | Suzuki et al. |
| 2010/0305271 A1 | 12/2010 | Mentink et al. |
| 2010/0310845 A1 | 12/2010 | Bond et al. |
| 2010/0311874 A1 | 12/2010 | Mentink et al. |
| 2010/0314162 A1 | 12/2010 | Gardner et al. |
| 2011/0015309 A1 | 1/2011 | Brocker et al. |
| 2011/0086949 A1 | 4/2011 | Mentink et al. |
| 2012/0009387 A1 | 1/2012 | Wang et al. |
| 2012/0139154 A1 | 6/2012 | Huneault et al. |
| 2012/0238170 A1 | 9/2012 | Weisman et al. |
| 2012/0238173 A1 | 9/2012 | Bond et al. |
| 2012/0315454 A1 | 12/2012 | Wang et al. |
| 2012/0321871 A1 | 12/2012 | Bond et al. |
| 2013/0023608 A1 | 1/2013 | Kellett et al. |
| 2013/0190408 A1 | 7/2013 | Scholz et al. |
| 2014/0056544 A1 | 2/2014 | Moras et al. |
| 2014/0079935 A1 | 3/2014 | Broyles |
| 2014/0099455 A1 | 4/2014 | Stanley et al. |
| 2014/0142226 A1 | 5/2014 | Bond et al. |
| 2014/0272357 A1 | 9/2014 | He et al. |
| 2014/0272370 A1 | 9/2014 | Broyles et al. |
| 2014/0296388 A1 | 10/2014 | Bond et al. |
| 2014/0296391 A1 | 10/2014 | Bond et al. |
| 2016/0032129 A1 | 2/2016 | Ruiz |
| 2017/0037241 A1 | 2/2017 | Schmidt et al. |
| 2018/0327587 A1 | 11/2018 | Marcille et al. |
| 2019/0194426 A1 | 6/2019 | LaPray et al. |
| 2020/0047390 A1 * | 2/2020 | McDaniel ................ B29C 48/57 |
| 2020/0048436 A1 | 2/2020 | Chen |
| 2020/0299504 A1 | 9/2020 | Munoz |
| 2021/0002792 A1 | 1/2021 | Shi et al. |

FOREIGN PATENT DOCUMENTS

| | | |
|---|---|---|
| CN | 101240086 | 8/2011 |
| CN | 102443195 | 5/2012 |
| CN | 103435985 | 12/2013 |
| CN | 104910439 | 9/2015 |
| CN | 107955212 | 4/2018 |
| CN | 111548536 | 8/2020 |
| CN | 113480782 | 10/2021 |
| EP | 2536776 | 12/2012 |
| FR | 3076744 | 1/2021 |
| WO | 2015/042641 | 4/2015 |
| WO | 2020/195429 | 10/2020 |
| WO | 2021/163778 | 8/2021 |
| WO | WO-2021159122 A1 * | 8/2021 ......... B29C 45/0001 |
| WO | 2021/211715 | 10/2021 |

OTHER PUBLICATIONS

Bulatović et al., "Biodegradable Polymer Blends Based on Thermoplastic Starch" Journal of Polymers and the Environment 29: 492-508, 2021. [abstract only, 12 pages] https://link.springer.com/article/10.1007/s10924-020-01874-w.

Cheng, "Preparation and properties of lignocellulosic fiber/CaCO3/thermoplastic starch composites" Carbohydrate Polymers 211: 204-208, May 1, 2019. [abstract only, 1 page] https://www.scinapse.io/papers/2914353871.

Diaz et al., "Thermoformed Containers Based on Starch and Starch/Coffee Waste Biochar Composites" Energies 13, 6034, 2020, 9 pages. https://www.mdpi.com/1996-1073/13/22/6034.

Gerezgiher et al., "Thermoplastic corn starch reinforced with pine wood fibre and calcium carbonate precipitate filler" Journal of Physics: Conference Series 1527: 1-7, 2020. https://iopscience.iop.org/article/10.1088/1742-6596/1527/1/012042.

Nazrin et al., "Water barrier and mechanical properties of sugar palm crystalline nanocellulose reinforced thermoplastic sugar palm starch (TPS)/poly(lactic acid) (PLA) blend bionanocomposites" Nanotechnology Reviews 2021; 10: 431-442. https://www.degruyter.com/document/doi/10.1515/ntrev-2021-0033/html.

Prabhu et al., "A review on present status and future challenges of starch based polymer films and their composites in food packaging applications" Polymer Composites 39(7): 2499-2522. [abstract only, 2 pages] https://onlinelibrary.wiley.com/doi/abs/10.1002/pc.24236.

Shi et al. "New breathable films using a thermoplastic cross-linked starch as a porogen" Journal of Applied Polymer Science 131 (21), Jun. 3, 2014. [abstract only, 3 pages] https://onlinelibrary.wiley.com/doi/abs/10.1002/app.41016.

Zhang et al., "Thermoplastic Starch Processing and Characteristics—A Review" Critical Reviews in Food Science and Nutrition 54(10): 1353-1370, 2014. [abstract only, 6 pages] https://www.tandfonline.com/doi/abs/10.1080/10408398.2011.636156.

Zhong et al., "Biodegradable polymers and green-based antimicrobial packaging materials: A mini-review" Advanced Industrial and Engineering Polymer Research 3: 27-35, 2020. https://www.sciencedirect.com/science/article/pii/S2542504819300508.

"BioLogiQ, NuPlastiQ BioPolymers GP 1000" datasheet, 1 page, 2018.

"BioLogiQ, NuPlastiQ XP 24550" datasheet, 1 page, May 22, 2018.

"Colortech 10414-19 Deodorant" datasheet, 2 pages, Jun. 2018.

"Heritage Plastics, PST-0334" datasheet, 1 page, Feb. 2020.

"Heritage Plastics, PST-0280" datasheet, 4 pages, Dec. 15, 2020.

"Polyfil Additives Technology, Product Information, GAC-1000-3, Gas Absorber Concentrate" datasheet, 1 page, Feb. 21, 2002.

International Search Report & Written Opinion from International Patent Application No. PCT/US23/67961, Oct. 5, 2023, 12 pages.

U.S. Department of Agriculture "BioPreferred® Program", BioPreferred Program Fact Sheet, Apr. 2021, 2 pages, retrieved from https://www.biopreferred.gov/BioPreferred/faces/pages/AboutBioPreferred.xhtml.

U.S. Department of Agriculture "Understanding Biobased Content," 2017, 6 pages, https://www.biopreferred.gov/BPResources/files/UnderstandingBiobasedContent_2017.pdf, retrieved from https://www.biopreferred.gov/BioPreferred/faces/pages/AboutBioPreferred.xhtml on Dec. 11, 2023.

Calcean Minerals & Materials LLC, "What is Oolitic Aragonite," 3 pages, retrieved and printed from https://www.calcean.com/what-is-oolitic-aragonite on Dec. 27, 2023.

* cited by examiner

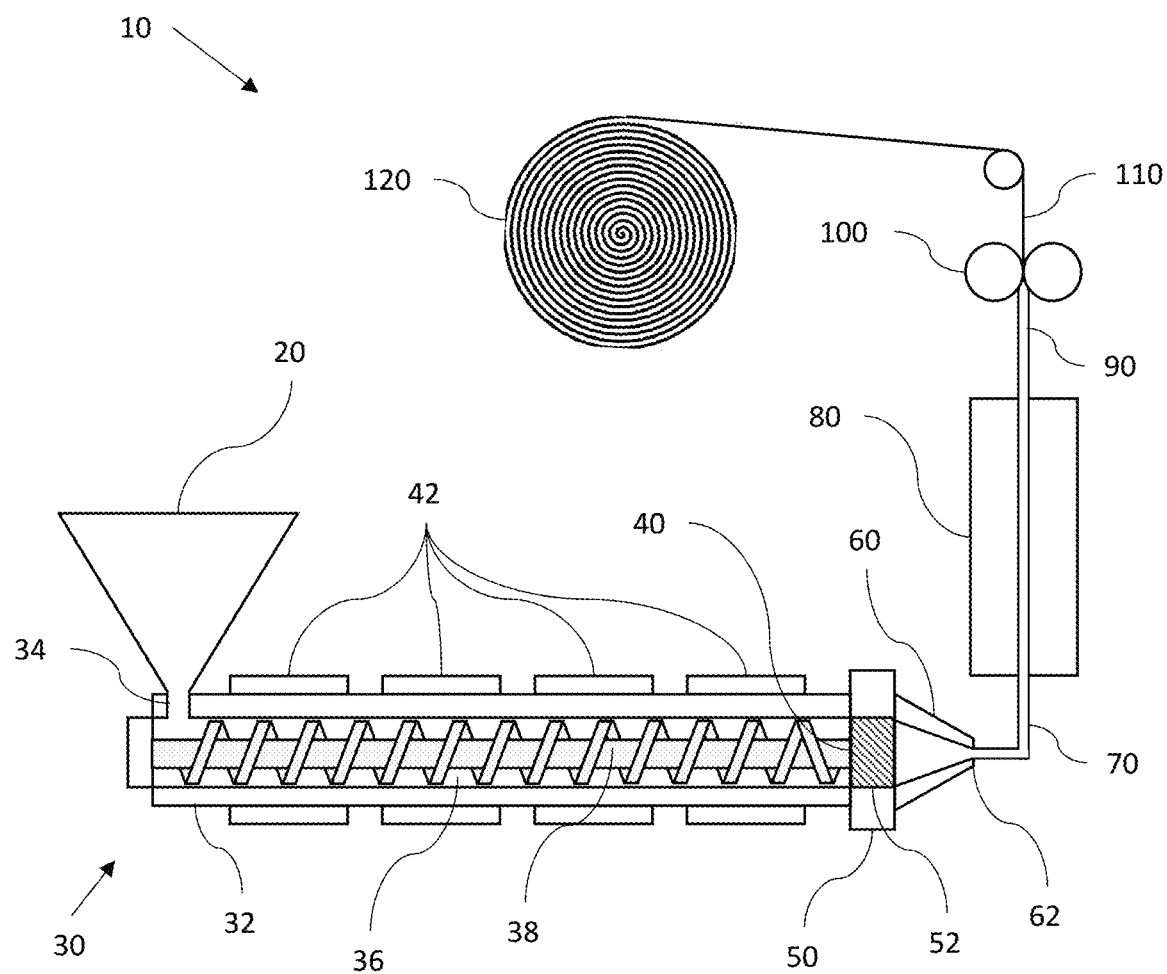

METHOD FOR MANUFACTURING RENEWABLE FILM AND PRODUCTS

BACKGROUND

Plastic products including bags and other containers are often made of non-renewable polymer films, such as polyethylene film. There are concerns regarding such non-renewable products, including environmental and sustainability concerns. There are also concerns regarding the manufacture of polymer films containing renewable material content and the use of such films for plastic products including bags and other containers. Present methods may not effectively manufacture a high-quality odorless film and plastic product containing sufficient renewable content.

BRIEF DESCRIPTION OF THE DRAWINGS

FIG. 1 is a schematic system diagram of an exemplary film manufacturing system.

DETAILED DESCRIPTION

The following disclosure provides different embodiments, or examples, for implementing different features of the subject matter. Specific examples of components, features, arrangements, or steps are described below to simplify the present disclosure. These are, of course, merely examples and are not intended to be limiting.

The methods of the present invention utilize a renewable blend (or mixture) and a manufacturing process for making the renewable blend into renewable film and products made from renewable film. In one embodiment, the methods can form a renewable film and a product composed thereof (e.g., a flexible or non-rigid plastic container) that can include a minimum amount of renewable material content, can exhibit odor reduction compared to existing renewable films or products, and can be of comparable quality (e.g., strength) compared to non-renewable films or products.

In one embodiment, the method for manufacturing a renewable film and related product includes an extrusion process. In one embodiment, the method for manufacturing a renewable film and related product includes forming a renewable blend (e.g., with a minimum amount of renewable material content), mixing and feeding the blend into an extruder, heating the blend into a melt using the extruder and components thereof (e.g., heating elements and a screw), passing the melt through a screen pack containing one or more wire mesh screens, passing the melt through a die (e.g., a blown film die) and shaping the melt into a desired profile or cross-sectional shape, cooling and solidifying the melt into a film using cooling or heat removal equipment, tailoring the film such as by nipping and/or trimming the film to a desired gauge, winding up or collecting the film, and creating an end product with the renewable content film, such as a non-rigid container.

In one embodiment, the method includes forming a renewable blend that contains one or more renewable contents. For example, a renewable content can be partially or fully biodegradable. In one embodiment, a blend contains one or more non-renewable contents and one or more renewable contents. The contents of a blend can be in the form of pellets, ground or granular powders, and/or liquids.

In one embodiment, a non-renewable content of the blend is polyethylene (PE). In one example, the polyethylene in the blend can be high-density polyethylene (HDPE), low-density polyethylene (LDPE), linear low-density polyethylene (LLDPE), and/or medium-density polyethylene (MDPE).

In one embodiment, a renewable content of the blend is a plant-based carbohydrate, such as starch. For example, a renewable content starch of the blend can be provided by, or in the form of, a biopolymer such as iQ® (NuPlastiQ®). For example, a renewable content starch of the blend can be provided by, or in the form of, a thermoplastic starch (TPS). In one embodiment, a renewable content of the blend can be a plasticizer, such as glycerin.

In one embodiment, a renewable content of the blend is a mineral. For example, the mineral can be calcium carbonate ($CaCO_3$), such as naturally occurring aragonite. In one example, the mineral can be oolitic aragonite.

In one embodiment, the blend has a target or minimum amount of renewable content. The amount of renewable content can be measured as a total combined amount of two or more renewable contents of the blend. The amount of renewable content can be measured by weight, for example, as a percentage or fraction of the total weight of the blend. For example, the minimum amount of renewable content in the blend can be about 5, 7.5, 10, 12.5, 15, 17.5, 20, 22.5, 25, 30, 35, or 40 percent of the blend by weight. In one embodiment, the minimum amount of renewable content is 20 percent; that is, the blend is 20 percent renewable.

In one embodiment, the one or more renewable contents of the blend do not include biopolyethylene, also known as renewable or "green" polyethylene, which can be made from feedstocks such as sugar cane, sugar beet, and wheat grain. In other embodiments, biopolyethylene can be a renewable content of the blend. For example, the renewable contents of the blend can include biopolyethylene and one or more other renewable contents (e.g., starch and/or mineral). The amounts recited herein for the minimum amount of renewable content in the blend or in the end product do not cover or count for biopolyethylene as a renewable content. For embodiments where biopolyethylene is a renewable content of the blend or end product, the minimum amount of renewable content in the blend or in the end product (including renewable content biopolyethylene) can be about 20, 30, 40, 50, 60, 70, 80, 90, 95, or 99 percent of the blend or end product by weight.

Manufacturing a film using a blend that includes a plant-based carbohydrate such as renewable content starch can create an unpleasant odor, such as an odor of burnt or toasted starches. The unpleasant odor can occur during the manufacturing process, such as during extrusion when the blend containing starch is heated to form a melt. The unpleasant odor can also persist with the manufactured film or end product made from a blend containing starch. For example, when a plastic product such as a bag or other container is made from a blend containing starch, the product can emit the unpleasant odor or impart the odor to contents contained or stored within the product. The amount of starch included in a blend can have a direct relationship with the amount or strength of the unpleasant odor.

In one embodiment, the method includes reducing, removing, absorbing, or covering the unpleasant odor associated with including a renewable content starch in the blend. For example, the method can include reducing or absorbing the odor emitted by the manufacturing process (e.g., extrusion process), the melt, the film, and/or the end product made from the film. In one embodiment, the unpleasant odor associated with starch is reduced or absorbed by including one or more renewable content minerals in the blend. In one example, the mineral is renewable calcium carbonate, such as oolitic aragonite, which can reduce or absorb the unpleasant odor. In one embodiment, one or more odor absorbers can be included in the blend, in addition to or as an alternative to a renewable content mineral. For example, an odor absorber can be a non-renewable molecular sieve.

Manufacturing a film with a high amount of renewable content mineral, such as oolitic aragonite, can compromise the quality of the film. For example, the mineral may cause clarity issues, such as visible optical defects in the film (e.g., lensing), and/or strength issues. In one embodiment, the method includes determining, balancing, and/or using an amount of renewable content starch, an amount of renewable content mineral(s), an amount of non-renewable content such as PE, and/or an amount of odor absorber(s) to obtain optimal strength and clarity and minimal odor in the film at a specific gauge.

In one embodiment, the method of manufacturing a renewable film includes using a blend with less than a threshold or maximum amount of one or more renewable content minerals in the blend. For example, the maximum amount for a mineral in the blend, or for the combined total amount of two or more minerals in the blend, can be the amount below which the quality of the manufactured film is not compromised or above which the film quality is compromised. In one example, a renewable film made from a blend containing a mineral in less than the maximum amount is of comparable quality (e.g., clarity and strength) to non-renewable polyethylene film. The maximum amount of renewable content mineral in the blend can be, for example, about 5, 7.5, 10, 12.5, 15, 17.5, 20, 22.5, 25, or 30 percent of the blend by weight. In one example, the maximum amount of renewable mineral in the blend is 30 percent. In one example, the blend contains less than 20 percent of renewable mineral, such as less than 10 percent of renewable mineral.

In one embodiment, the method of manufacturing a renewable film includes using a blend that contains both (1) a renewable content starch and (2) a renewable content mineral, such as calcium carbonate (e.g., oolitic aragonite). A blend containing both starch and a mineral such as oolitic aragonite can, for example, reduce or absorb the odor caused by the starch. A blend containing both starch and a mineral such as oolitic aragonite can, for example, achieve a higher total minimum amount of renewable content compared to a blend containing only one of the starch and mineral. A blend containing both starch and a mineral such as oolitic aragonite can, for example, achieve a higher total minimum amount of renewable content compared to a blend containing only the mineral, without compromising the quality of the manufactured film by including more than a maximum amount of the mineral.

For example, the ratio of the amount of renewable content starch to the amount of renewable content mineral in a blend, by weight, can be between 1:1 and 10:1, such as a ratio of about 1:1, 1.5:1, 2:1, 2.5:1, 3:1, 4:1, 5:1, 6:1, 7:1, 8:1, 9:1, or 10:1. In one example, the ratio of the amount of starch to the amount of mineral in the blend is about 2:1 to 3:1.

For example, a blend including a renewable starch and renewable mineral can include an amount of starch of at least about 5, 7.5, 10, 12.5, 15, 17.5, 20, 22.5, 25, or 30 percent of the blend by weight. In one example, the amount of renewable content starch in the blend is at least 15 percent. For example, a blend including a renewable starch and renewable mineral can include an amount of mineral of at least about 5, 7.5, 10, 12.5, 15, 17.5, 20, 22.5, 25, or 30 percent of the blend by weight. For example, the combined amount of renewable starch and mineral in a blend can be at least about 5, 7.5, 10, 12.5, 15, 17.5, 20, 22.5, 25, 30, 35, or 40 percent of the blend by weight. In one example, the combined amount of renewable starch and mineral in the blend is at least 20 percent.

FIG. 1 shows a schematic system diagram of an exemplary film manufacturing system 10 that can be used for implementing the method for manufacturing a renewable film.

In one embodiment, the method for manufacturing a renewable film includes mixing and feeding the blend to an extruder, such as extruder 30. For example, this process can be implemented using a hopper, blender, and/or other feeder device, such as hopper 20, which feeds a blend into feed throat 34 of extruder 30. In one example, this process includes operating a feeder device such as mass flow hopper 20, to maintain a consistent mass flow rate of the blend to extruder 30.

In one embodiment, the method for manufacturing a renewable film includes using an extruder to heat and form the blend into a melt and cause the melt to flow. This process can include (1) operating the extruder at one or more melt temperatures to melt or form the blend into a melt and (2) operating a screw of the extruder to make the blend and melt move or flow through the extruder.

For example, extruder 30 includes an extruder body 32 and a barrel 36, which consists of a tubular cavity formed in extruder body 32 that extends from feed throat 34 on a first end of extruder body 32 to an output opening 40 on the opposite second end of extruder body 32. Extruder 30 also includes a screw 38 operatively disposed and positioned in barrel 36 such that the rotation of screw 38 around its axis moves a substance in barrel 36 from feed throat 34 at the first end of extruder body 32 to output opening 40 at the second end. Extruder 30 also includes a plurality of heating elements 42 positioned along the sides of extruder body 32 and configured to heat a substance in barrel 36.

When the blend is fed by hopper 20 through feed throat 34 into barrel 36, rotation of screw 38 can move the blend, or a melt thereof, through barrel 36 from the feed throat 34 at the first end of extruder body 32 toward the output opening 40 at the second end. When the blend is in barrel 36, it can heated by the plurality of heaters 42 to a melt temperature to transform the blend into a melt. For example, extruder 30 can be operated to receive the blend through feed throat 34, heat and move the blend through barrel 36 using heaters 42 and screw 38, respectively, until the blend forms a melt, and continue to heat and move the melt through barrel 36 using heaters 42 and screw 38, respectively, until the melt exits barrel 36 through output opening 40.

In one example, extruder 30 can use the plurality of heaters 32 to operate two or more different zones with different temperatures. In one example, screw 38 can include different zones, such as a feed zone proximate to feed throat 34 for conveying the blend through barrel 36, a metering zone proximate to output opening 40 for homogenizing the melt (e.g., with back pressure or mixing elements), and a compression zone between the feed zone and metering zone for melting and compacting the blend into a melt.

In one embodiment, the method for manufacturing a renewable film includes determining, and operating the extruder at, a screw speed and a melt temperature based on the type(s) and amount(s) of renewable content in the blend. For example, a plant-based carbohydrate such as starch can be less thermally stable than a non-renewable polymer such as polyethylene and can affect the viscosity of the melt, so an extruder may be operated at a lower melt temperature and different screw speed for a blend containing an amount of renewable content starch as compared to a non-renewable blend of polyethylene.

In one embodiment, the method includes determining and operating the screw of the extruder (e.g., screw 38 of extruder 30) at a desired speed based on the amount of renewable content in the blend, such as the amount of renewable content starch, the amount of renewable content mineral, and/or the combined amount of starch and mineral. In one example, the method includes determining and operating the screw at a speed based on the amount by weight of renewable content starch and renewable content mineral within the blend. In one example, the method can include determining and operating the screw at a second different speed based on a second different amount by weight of renewable content starch and renewable content mineral within the blend. In one embodiment, the screw speed (e.g., the speed of screw 38) is about 20 to 80 percent of the maximum operating speed of the extrusion equipment (e.g., the maximum speed at which at which extruder 30 can operate a screw), such as about 40 to 80 percent or about 60 to 80 percent. The maximum operating speed of the extrusion equipment can be, for example, about 90, 100, 110, 120, 130, 140, 150, or 160 revolutions per minute (RPM) or more than 160 RPMs. In one embodiment, the screw speed is less than or equal to about 30, 40, 50, 60, 70, 80, or 90 percent of the maximum operating speed of the extrusion equipment. In one embodiment, the screw speed is a highest speed at which the screw can be operated to extrude the melt without exceeding a desired melt temperature.

In one embodiment, the method includes determining and operating the extruder, or one or more zones of the extruder, at one or more desired melt temperatures based on the amount of renewable content of the blend, such as the amount of renewable content starch, the amount of renewable content mineral, or the combined amount of starch and mineral. In one example, the method includes determining and operating the extruder at a melt temperature based on the amount by weight of renewable content starch and renewable content mineral within the blend. In one example, the method includes determining and operating the extruder at a second different melt temperature based on a second different amount by weight of renewable content starch and renewable content mineral within the blend. In one embodiment, the melt temperature (e.g., the melt temperature at which extruder 30 is operated) is in the range of about 300 to about 450° F., such as about 350 to about 380° F. In one embodiment, the melt temperature is less than or equal to about 340, 350, 360, 370, or 380° F.

In one embodiment, where the blend/melt contains a renewable content starch, the method for manufacturing a renewable film includes reducing or absorbing an unpleasant odor emitted by the manufacturing process (e.g., the extrusion process) or melt. For example, the odor can be reduced or absorbed by including in the blend/melt a renewable content mineral such as renewable calcium carbonate (e.g., oolitic aragonite). In one example, the method can include reducing the odor compared to the odor emitted by a comparable extrusion of a blend/melt that does not contain a renewable content mineral. In one example, the method can include reducing the odor compared to the odor emitted by a comparable extrusion of a blend/melt with a ratio of renewable content starch to renewable content mineral, by weight, of greater than about 1:1, 1.5:1, 2:1, 2.5:1, 3:1, 4:1, 5:1, 6:1, 7:1, 8:1, 9:1, or 10:1.

In one embodiment, the method for manufacturing a renewable film includes screening the melt. For example, screening the melt can be implemented by a screen or screen pack, such as screen pack 50 of film manufacturing system 10.

For example, screen pack 50 is connected or disposed adjacent to output opening 40 at the second end of extruder 30 to receive melt that flows through output opening 40. That is, screen pack 50 is in fluid communication with output opening 40 such that the melt that exits barrel 36 through output opening 40 then passes through screen pack 50. A screen pack can include one or more melt-through wire mesh screens. For example, screen pack 50 includes screen 52. A screen or screen pack, for example, can filter foreign particles or contaminates from the melt and can homogenize the melt (e.g., to ensure uniformity of components in the melt). For example, a screen or screen pack can have a mesh rating. In some examples, the mesh rating of a screen or screen pack can be 40 to 300 mesh.

In one embodiment, the method for manufacturing a renewable film includes determining a desired mesh rating of a screen or screen pack (e.g., screen pack 50), and causing the melt to pass through a screen or screen pack of that mesh rating, based on the type(s) and amount(s) of renewable content in the blend or melt. For example, the method can include determining and using a mesh rating based on the amount of renewable content starch, the amount of renewable content mineral, and/or the combined amount of starch and mineral. For example, a desired mesh rating may be selected to disperse the renewable content materials in the melt and prevent voids, such as by creating a uniform dispersion of renewable content starch and/or mineral among the polyethylene of a melt. In one example, the method includes determining and using a minimum mesh rating based on the amount by weight of renewable content starch and renewable content mineral within the blend or melt. In one example, the method can include determining and using a second different minimum mesh rating based on a second different amount by weight of renewable content starch and renewable content mineral within the blend or melt. In one embodiment, the desired mesh rating of the screen or screen pack is at least 60, 80, 100, 120, 140, or 160 mesh.

In one embodiment, the method for manufacturing a renewable film includes shaping the melt by causing the melt to pass through a die. For example, shaping the melt can be implemented by one or more dies, such as die 60 of film manufacturing system 10.

For example, die 60 is connected or disposed adjacent to screen pack 50 to receive melt that flows through screen pack 50 from output opening 40 extruder 30. That is, die 60 is in fluid communication with output opening 40 through screen 52 of screen pack 50 such that the melt that exits output opening 40 passes through screen pack 50 and then into die 60. A die can include one or more die openings to shape or form the melt into a desired profile or cross-sectional shape. For example, die 60 includes die opening 62, and melt received by die 60 passes through die opening 62 and is shaped by die opening 62 into extruded melt 70.

In one embodiment, the desired shape of the melt and/or the die opening can be based on a desired use for the film. For example, for a film for manufacturing an end product in the form of a non-rigid container such as a bag, the desired shape of the melt can be a substantially thin or flat sheet or film. For such a film, the die opening can be shaped, for example, as a narrow slit or as a blown film die. A blown film die can include a thin tubular or circular die opening with an air supply in the center of the die opening to produce air pressure on the internal side of the melt/film that passes through the die opening.

In one embodiment, the method includes positioning and operating a vent at or proximate to a die, or one or more die openings thereof. For example, the vent can capture and remove gas that volatizes during or after the extrusion process and is emitted at or proximate to the die, such as from the polymer melt after the melt passes through the die. In one example, the blend/melt can contain glycerin, and the method can include positioning and operating a vent near a die of the extruder to capture and remove at least a portion of the glycerin that is volatized during the extrusion process.

In one embodiment, the method for manufacturing a renewable film includes cooling the extruded melt to form a film. For example, cooling the melt into a film can be implemented by a cooling system, such as cooling system 80 of film manufacturing system 10, which cools extruded melt 70 to form film 90. For example, cooling system 80 can include heat removal equipment. In one example, cooling system 80 can use water (e.g., cooled water) or air (e.g., blown air). In one example, cooling system 80 can include elements used with blown film extrusion processes, such as a vertical tower between die 60 and nip rollers 100, and an air ring and a blower.

In one embodiment, the method for manufacturing a renewable film includes determining and adjusting the gauge of the film. For example, the film can be nipped to a desired gauge using nip rollers, such as nip rollers 100 of film manufacturing system 10, which nip film 90 to form nipped film 110 with a desired gauge. In one embodiment, the desired gauge of the film can be based on the desired use of the film. For example, the gauge can be selected and adjusted such that the film is suitable for and can be formed into a certain end product, such as a bag or other container, as discussed below. For example, the gauge can be selected such that the film is suitable for and can be formed into a reclosable or non-reclosable food (e.g., sandwich) bag (e.g., 0.6 to 1.2 mils), storage bag (e.g., 1.3 to 1.8 mils), freezer bag (e.g., 2.0 to 3.0 mils), waste bag (e.g., 0.5 to 5 mils), or other type of bag. For example, the gauge may be between 0.5 and 10 mils, such as between 0.5 and 7.5 mils, 0.5 and 5 mils, or 0.5 and 2.5 mils. For example, the gauge may be less than 10, 8, 6, 5, 4, 3, 2.5, 2, 1.5, or 1 mils.

In one embodiment, the type and amount of one or more renewable contents of the blend used to manufacture a renewable film can be determined or adjusted based on a desired gauge of the film or a desired use of the film. For example, an amount of renewable content starch and/or renewable content mineral in a blend can be determined or adjusted based on a desired gauge of the film or a desired use of the film manufactured using the blend. For example, an amount of renewable content starch and/or renewable content mineral in a blend can be determined or adjusted based on whether the film manufactured using the blend is desired for making a food (e.g., sandwich) bag, a storage bag, a freezer bag, a waste bag, or other type of bag.

In one embodiment, the method for manufacturing a renewable film includes winding up the film into a spool or other form of storing or packaging film. For example, in film manufacturing system 10, which winds up nipped film 110 into spool 120. Spool 120 can be used for collecting, storing, packaging, or transporting the film. In one example, film can be unwound or removed from spool 120 for manufacturing an end product using the film.

In one embodiment, methods described herein—such as forming a renewable blend, mixing and feeding the blend into an extruder, heating the blend into a melt, passing the melt through a screen pack, shaping the melt, and cooling and solidifying the melt—can also be used to form a non-film renewable polymer object, such as a closure element for a bag.

In one embodiment, the method includes using the renewable film to make or form an end product or portion thereof. In one embodiment, the end product is composed completely of one or more renewable films manufactured using the methods described herein. In one embodiment, the end product is composed substantially of one or more renewable films manufactured using the methods described herein, such that the one or more renewable films make up at least 50, 60, 70, 75, 80, 85, 90, 95, 98, or 99 percent of the product by weight. In one embodiment, the end product is composed substantially of one or more renewable films manufactured using the methods described herein and the remainder of the product is composed of one or more non-film renewable polymer objects manufactured using the methods described herein.

In one embodiment, the end product can be a non-rigid container such as a bag or other flexible packaging device. For example, the end product can be a food (e.g., sandwich) bag, storage bag, freezer bag, waste bag or other type of bag. For example, the end product can be a bag of any size, such as a sandwich-size, quart, half-gallon, gallon, 3-4 gallon, 7-10 gallon, 12-16 gallon, 20-30 gallon, 30-40 gallon, 40-55 gallon, or larger than 40-55 gallon bag. In one embodiment, one or more renewable films manufactured using the methods described herein are made into a non-rigid container such as a bag by joining together edges of the film(s) using sealing (e.g., via heat sealing), stitching, or adhesive to create one or more seams.

In one embodiment, the bag can be closable or reclosable. For example, the bag can include one or more closable or reclosable closure elements, which can allow the bag to be closable or reclosable. For example, a closure element can be a press-to-close closure element, a slider or zipper closure element, a fold-over closure element, a draw-string closure element, or other type of closure element. In one embodiment, one or more closure elements are positioned or disposed at or proximate to an open or top portion of the bag, such as at or around the circumference of an opening of the bag. For example, the one or more closure elements can be coupled to the bag at or proximate to an open or top portion of the bag.

In one embodiment, a closure element can be manufactured using the methods described herein, such that an end product bag can be composed of one or more renewable films and one or more renewable closure elements all manufactured according to the methods described herein. For example, the closure element can be manufactured by forming a renewable blend that contains one or more renewable contents, such as a renewable content starch and renewable content mineral, and one or more non-renewable contents, such as polyethylene; causing the blend to undergo an extrusion process and screening, for example, in which the screw speed, melt temperature, and mesh rating are based on the type(s) and amount(s) of renewable content in the blend; and shaping, cooling, and otherwise forming the melt and/or polymer object into the form of a closure element.

In one embodiment, the end product has a target or minimum amount of renewable content. The amount of renewable content can be measured as a total combined amount of two or more renewable contents of which the end product is composed. The amount of renewable content can be measured by weight, for example, as a percentage or fraction of the total weight of the end product. For example, the minimum amount of renewable content in the end product can be about 5, 7.5, 10, 12.5, 15, 17.5, 20, 22.5, 25, 30, 35, or 40 percent of the end product by weight. In one embodiment, the minimum amount of renewable content is 20 percent; that is, the end product is 20 percent renewable. An end product that includes renewable content is beneficial, for example, due to reliance on renewable and sustainable resources and the result of reduced waste, increased biodegradability, and environmental protection.

In one embodiment, the method includes making an end product that contains both (1) a renewable content starch and (2) a renewable content mineral, such as calcium carbonate (e.g., oolitic aragonite). For example, the ratio of the amount of renewable content starch to the amount of renewable content mineral in an end product, by weight, can be between 1:1 and 10:1, such as a ratio of about 1:1, 1.5:1, 2:1, 2.5:1, 3:1, 4:1, 5:1, 6:1, 7:1, 8:1, 9:1, or 10:1. In one example, the ratio of the amount of starch to the amount of mineral in the end product is about two or three to one (i.e., 2:1 to 3:1).

For example, an end product including a renewable starch and renewable mineral can include an amount of starch of at least about 5, 7.5, 10, 12.5, 15, 17.5, 20, 22.5, 25, or 30 percent of the end product by weight. In one example, the amount of renewable content starch in the end product is at least 15 percent. For example, an end product including a renewable starch and renewable mineral can include an amount of mineral of at least about 5, 7.5, 10, 12.5, 15, 17.5, 20, 22.5, 25, or 30 percent of the end product by weight. For example, the combined amount of renewable starch and mineral in an end product can be at least about 5, 7.5, 10, 12.5, 15, 17.5, 20, 22.5, 25, 30, 35, or 40 percent of the end product by weight. In one example, the combined amount of renewable starch and mineral in the end product is at least 20 percent.

In one embodiment, where the end product contains a renewable content starch, the method for manufacturing the end product includes reducing or absorbing an unpleasant odor emitted by the end product or imparted by the end product to another substance (e.g., food stored in an end product bag). For example, the odor can be reduced or absorbed by including in the end product a renewable content mineral such as renewable calcium carbonate (e.g., oolitic aragonite). In one example, the method can include reducing the odor compared to the odor emitted by a comparable end product that does not contain a renewable content mineral. In one example, the method can include reducing the odor compared to the odor emitted by a comparable end product with a ratio of renewable content starch to renewable content mineral, by weight, of greater than about 1:1, 1.5:1, 2:1, 2.5:1, 3:1, 4:1, 5:1, 6:1, 7:1, 8:1, 9:1, or 10:1.

The foregoing description, for purposes of illustration and explanation, used specific nomenclature to provide a thorough understanding of the invention. However, it will be apparent to one skilled in the art that specific details are not required in order to practice the invention. Thus, the foregoing descriptions of specific embodiments of the invention are not intended to be exhaustive or to limit the invention to the precise forms disclosed; obviously, many modifications and variations are possible in view of the above teachings. The embodiments were chosen and described in order to best explain the principles of the invention and its practical applications, and they thereby enable others skilled in the art to best utilize the invention and various embodiments with various modifications as are suited to the particular use contemplated.

The invention claimed is:

1. A method of manufacturing a film comprising:
forming a blend, wherein the blend comprises: (i) a renewable content starch, (ii) a renewable content mineral comprising oolitic aragonite, and (iii) polyethylene;
operating a mass flow hopper to maintain a consistent mass flow rate of the blend to a feed throat of an extruder;
operating a screw of the extruder at a speed, wherein the speed is based on the amount by weight of (i) the renewable content starch and (ii) the renewable content mineral within the blend;
operating the extruder at a melt temperature, wherein the melt temperature is based on the amount by weight of (i) the renewable content starch and (ii) the renewable content mineral within the blend;
causing a melt of the blend to pass through a screen pack and a die, wherein the mesh rating of the screen pack is based on the amount by weight of (i) the renewable content starch and (ii) the renewable content mineral within the blend;
cooling the melt into a film after the melt passes through the die; and
nipping the film to a gauge such that the film can be formed into a bag.

2. The method of claim 1, wherein a bag formed from the manufactured film comprises at least twenty percent renewable material content.

3. The method of claim 1, wherein the blend comprises at least fifteen percent by weight the renewable content starch.

4. The method of claim 1, wherein the blend comprises an odor absorber.

5. The method of claim 1, wherein the renewable content mineral absorbs odor given off by the renewable content starch during the manufacturing process.

6. The method of claim 1, wherein the gauge of the manufactured film is suitable for at least one of a sandwich bag, a storage bag, a freezer bag, and a waste bag.

7. The method of claim 1, wherein the mesh rating of the screen pack is at least 80 mesh.

8. The method of claim 1, further comprising:
forming the film into the bag;
coupling a reclosable closure element to a top portion of the bag.

9. The method of claim 1, wherein the blend comprises glycerin, the method further comprising:
operating a vent near a die of the extruder to remove at least a portion of the glycerin that is volatilized during extrusion.

10. The method of claim 1, wherein the gauge of the nipped film is between 0.5 and 5 mils.

11. The method of claim 1, further comprising:
adjusting, based on a desired gauge of the film, the amount by weight of the renewable content starch within the blend.

12. The method of claim 1, further comprising:
adjusting, based on a desired use of the film, the amount by weight of the renewable content starch within the blend.

13. The method of claim 12, wherein the desired use of the film is at least one of a sandwich bag, a storage bag, a freezer bag, and a waste bag.

14. The method of claim 1, further comprising:
determining, based on at least one of a desired use of the film and a desired gauge of the film, an amount by weight of the renewable content starch to be formed into the blend.

15. The method of claim 1, wherein an amount by weight of the renewable content starch formed into the blend is greater than an amount by weight of the renewable content mineral formed into the blend.

16. The method of claim 15, wherein a ratio of the amount of the renewable content starch to the amount of the renewable content mineral within the blend is about two to one.

17. The method of claim 1, further comprising determining, based on at least one of a desired gauge or desired use for the manufactured film, a desired blend ratio of (i) the renewable content starch, (ii) the renewable content mineral comprising oolitic aragonite, and (iii) polyethylene.

18. The method of claim 1, wherein the polyethylene is not renewable.

19. A method of manufacturing a film comprising:
determining a use for a manufactured film;
determining, based on the use for the manufactured film, a desired gauge for the manufactured film;
determining, based on at least one of the desired gauge and desired use for the manufactured film, a desired ratio of (i) a renewable content starch, (ii) a renewable content mineral, and (iii) polyethylene;
mixing (i) the renewable content starch, (ii) the renewable content mineral, and (iii) the polyethylene at the desired ratio to create a blend;
operating film extrusion equipment to form the manufactured film from the blend.

20. The method of claim 19, further comprising:
determining, based on the amount by weight of (i) the renewable content starch and (ii) the renewable content mineral within the blend, a melt temperature at which to operate an extruder of the film extrusion equipment.

* * * * *